United States Patent
Werni et al.

(10) Patent No.: US 8,336,301 B2
(45) Date of Patent: Dec. 25, 2012

(54) EXHAUST GAS TREATMENT UNIT

(75) Inventors: Marcus Werni, Waiblingen (DE); Andreas Sauer, Eislingen (DE)

(73) Assignee: J. Eberspaecher GmbH & Co. KG, Esslingen (DE)

( * ) Notice: Subject to any disclaimer, the term of this patent is extended or adjusted under 35 U.S.C. 154(b) by 596 days.

(21) Appl. No.: 12/435,501

(22) Filed: May 5, 2009

(65) Prior Publication Data

US 2009/0272106 A1 Nov. 5, 2009

(30) Foreign Application Priority Data

May 5, 2008 (DE) .......................... 10 2008 022 081

(51) Int. Cl.
*F01N 3/00* (2006.01)

(52) U.S. Cl. ................. 60/297; 60/299; 60/300; 60/302; 60/312; 60/322; 181/222; 181/231; 181/240; 181/252; 181/256

(58) Field of Classification Search .................... 60/297, 60/299, 300, 301, 312, 313, 302, 322, 324; 181/210, 222, 231, 240, 249, 252, 255, 256
See application file for complete search history.

(56) References Cited

U.S. PATENT DOCUMENTS

| | | | |
|---|---|---|---|
| 3,989,471 A | 11/1976 | Nowak | |
| 4,108,276 A * | 8/1978 | Hall et al. | 181/256 |
| 4,601,168 A * | 7/1986 | Harris | 60/299 |
| 4,730,454 A | 3/1988 | Pischinger et al. | |
| 5,009,065 A * | 4/1991 | Howe et al. | 60/288 |
| 5,016,438 A * | 5/1991 | Harris | 60/299 |
| 5,198,625 A * | 3/1993 | Borla | 181/248 |
| 5,212,948 A | 5/1993 | Gillingham et al. | |
| 5,396,764 A | 3/1995 | Rao et al. | |
| 5,426,269 A * | 6/1995 | Wagner et al. | 181/232 |
| 6,729,127 B2 * | 5/2004 | Woerner et al. | 60/297 |
| 6,935,461 B2 * | 8/2005 | Marocco | 181/270 |
| 7,127,884 B2 * | 10/2006 | Worner et al. | 60/299 |
| 7,380,397 B2 * | 6/2008 | Chang | 60/324 |
| 7,384,609 B2 * | 6/2008 | Zauner | 422/168 |
| 7,694,778 B2 * | 4/2010 | Toyoshima et al. | 181/268 |
| 7,854,296 B2 * | 12/2010 | Saunders et al. | 181/240 |
| 2004/0202591 A1 | 10/2004 | Jacob et al. | |

FOREIGN PATENT DOCUMENTS

| | | |
|---|---|---|
| EP | 0 393 257 A1 | 10/1990 |
| EP | 0 420 521 A1 | 4/1991 |
| EP | 0 953 741 A1 | 11/1999 |
| JP | 2002070524 A | 3/2002 |

* cited by examiner

*Primary Examiner* — Binh Q Tran

(74) *Attorney, Agent, or Firm* — Reinhart Boerner Van Deuren P.C.

(57) ABSTRACT

The present invention relates to an exhaust gas treatment unit for an exhaust system of a combustion engine, in particular of a motor vehicle, includes a housing, a plurality of exhaust gas treatment elements, which are arranged in the housing and through which a parallel flow is possible. The unit further includes an outlet nozzle, which penetrates a side face of the housing, and an outlet space disposed in the housing, whereby the outlet of at least one of the exhaust gas treatment elements opens into the outlet space. The rigidity and/or effectiveness of the exhaust gas treatment unit can be improved by means of a funnel body disposed in the outlet space, and comprising a funnel surface which is permeable to exhaust gas. The funnel body connects an outlet end of one of the exhaust gas treatment elements with the outlet nozzle.

29 Claims, 6 Drawing Sheets

EXHAUST GAS TREATMENT UNIT

CROSS-REFERENCE TO RELATED PATENT APPLICATIONS

This patent application claims the benefit of co-pending German Patent Application No. DE 102008022081.7, filed May 5, 2008, the entire teachings and disclosure of which are incorporated herein by reference thereto.

FIELD OF THE INVENTION

The present invention relates to an exhaust gas treatment unit for an exhaust system of a combustion engine, especially of a motor vehicle.

BACKGROUND OF THE INVENTION

Exhaust gas treatment units comprise a plurality of exhaust gas treatment elements, which are arranged in a housing and through which a parallel flow is possible. These exhaust gas treatment elements can open out into a common outlet space. An outlet tube or outlet nozzle leads from the outlet space out of the housing. A number of problems can however result from this. Firstly, the tube must be relatively firmly supported at the housing. Secondly, the flow from the various exhaust gas treatment elements towards the outlet tube/nozzle should be evenly distributed.

BRIEF SUMMARY OF THE INVENTION

It is the object of the present invention to overcome the above-mentioned disadvantages of the prior art.

In particular, the object of embodiments of the present invention are to provide an improved design of an exhaust gas treatment unit of the type mentioned above, which is characterised, in particular, by its compact and rigid construction. At the same time, an improved flow, in particular a more even flow, through the exhaust gas treatment elements should be achieved.

The problems described above are solved by the object of the independent claims. Advantageous embodiments of the invention are objects of the dependent claims.

Embodiments of the invention are based upon the general idea of providing the outlet nozzle, which opens into the outlet space, with a funnel body which is arranged in the outlet space and connects the outlet end of one of the exhaust gas treatment elements with the outlet nozzle. Furthermore, the funnel body has an exhaust gas permeable surface. Exhaust gas which exits the at least one other exhaust gas treatment element flows through the exhaust gas permeable surface of the funnel to the outlet nozzle.

On the one hand, the funnel body firmly supports the outlet nozzle and therefore advantageously enables stiffening of the housing. On the other hand, by an appropriate design of the permeability of the funnel surface the pressure distribution in the outlet space can be influenced to such effect that the exhaust gas treatment unit has a reduced flow resistance.

According to an advantageous embodiment, the funnel body can be attached to an intermediate face which borders the outlet space and which is penetrated by the outlet ends of the exhaust gas treatment elements. At the same time the funnel body can also be attached to the outlet nozzle and/or to the side face which is penetrated by the outlet nozzle. The funnel body therefore enables a firm support of the outlet nozzle by the intermediate face, which significantly increases the stability of the housing in the area of the outlet nozzle.

In another advantageous embodiment, the permeability to exhaust gases of the funnel surface can be provided by a perforation and/or cut-outs and/or openings in the surface, and/or by forming the funnel surface as a segment.

The proposed measures for the implementation of the exhaust gas permeable surface of the funnel are suitable, in particular, for the targeted control of the flow in the outlet space, thus achieving the desired distribution of pressure in the outlet space, especially at the outlet ends of the individual exhaust gas treatment elements. The goal of the design is particularly to create an approximately equal flow resistance through all the exhaust gas treatment elements in order to distribute the gas as evenly as possible through all the exhaust gas treatment elements. As a result, the collective available surface of the exhaust gas treatment elements can be more evenly and therefore better utilized. This leads altogether to the increased effectiveness of the exhaust gas treatment unit, whereby the flow resistance of the exhaust gas treatment unit is also reduced.

An alternative embodiment of the invention is based upon the general idea of providing an inlet tube leading to an inlet space with a flow cross sectional area which increases in the direction of flow. This provision creates a certain diffuser effect, contributing to an even pressure distribution in the inlet space. Therefore the flow through the exhaust gas treatment elements can be homogenized, which causes a reduction of the flow resistance of the exhaust gas treatment unit.

Further important features and advantages of embodiments of the invention can be found in the dependent claims, the drawings and the corresponding description of the drawings.

The invention is of course not limited to the above described combination of features and the combination of features in the following description. These features may be used alone or in other combinations without departing from the spirit of the present invention.

Other aspects, objectives and advantages of the invention will become more apparent from the following detailed description when taken in conjunction with the accompanying drawings.

BRIEF DESCRIPTION OF THE DRAWINGS

Preferred embodiments of the invention are shown in the drawings and will be described in more detail in the following description, whereby like elements are designated by like reference numerals and wherein.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 5:
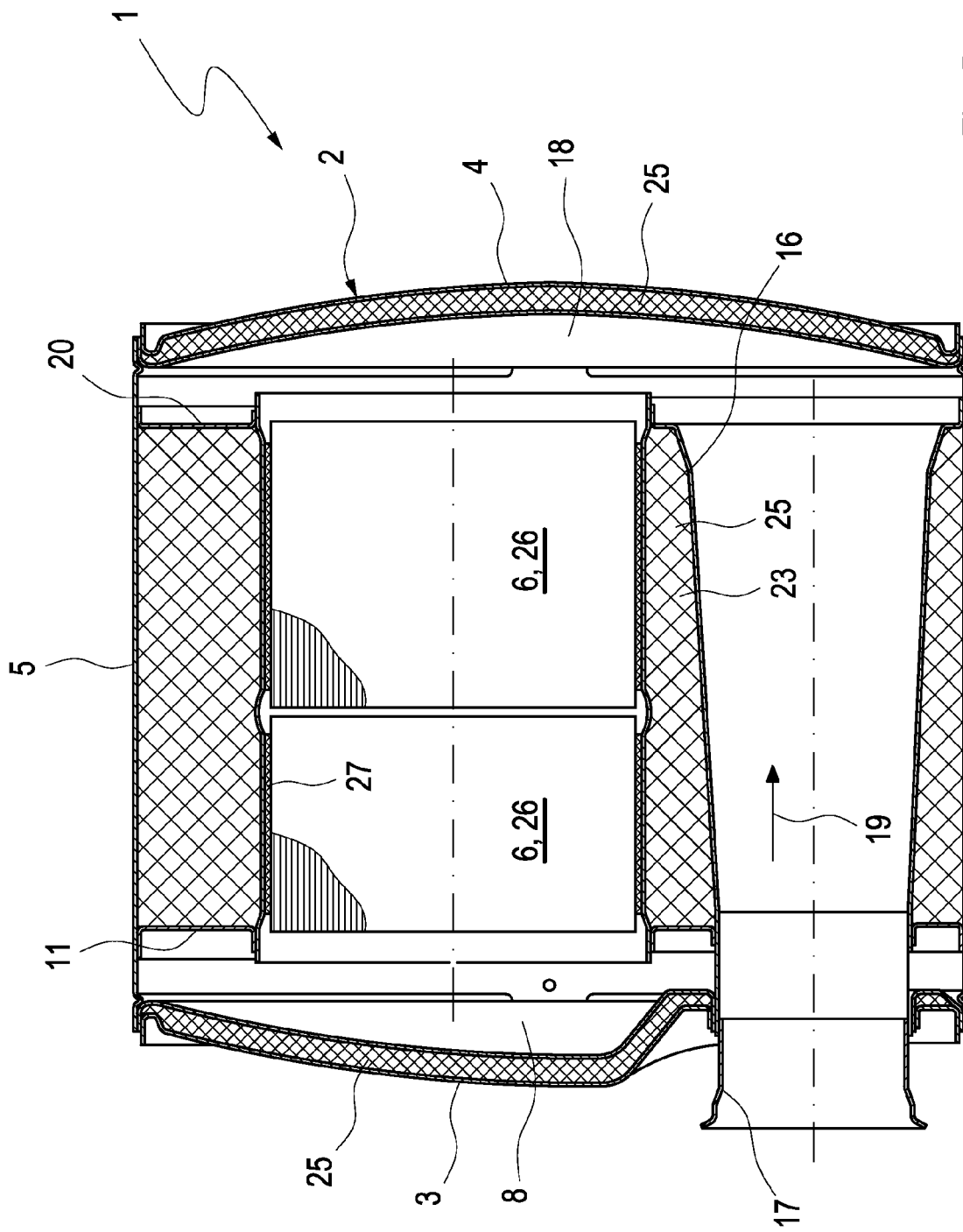
FIGS. 5 and 6 show lateral cuts of various embodiments of the exhaust gas treatment unit in an area of an inlet tube.
Figure 6:
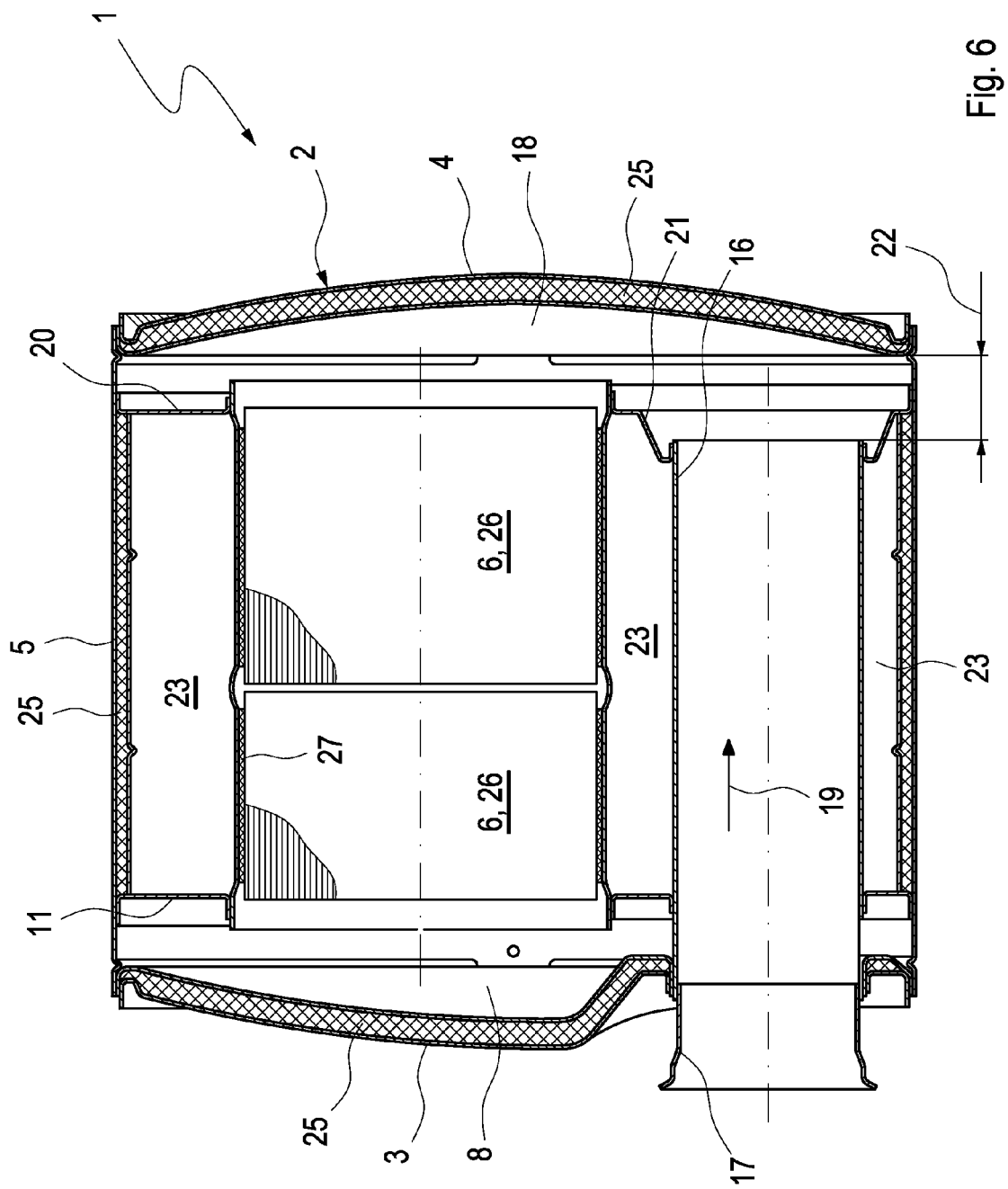

According to FIGS. 1 to 6, an exhaust gas treatment unit, especially for use in an exhaust system of a combustion engine of a motor vehicle, comprises a housing 2 that has a first side face 3, which is not shown in FIGS. 1-4 but only in FIGS. 5 and 6. Furthermore, the housing 2 has second side face 4 which again is only shown in FIGS. 5 and 6. The housing 2 further comprises a surface 5, which connects both side faces 3 and 4 together and encloses an internal space of the housing, which is not described in any more detail.

The exhaust gas treatment unit has a plurality of exhaust gas treatment elements 6. These are arranged parallel in the housing 2, such that a parallel flow through the elements can exist. As an example, three of such exhaust gas treatment elements 6 are shown. There may be more or less elements, however there should be at least two exhaust gas treatment elements 6. The housing 2 is provided with an outlet nozzle, which penetrates through the first side face 3. Furthermore, the housing 2 comprises an outlet space 8, whereby the end of least one of the exhaust gas treatment elements 6 opens directly into the outlet space 8. In the present example two of the three exhaust gas treatment elements 6 open directly into the outlet space 8. Furthermore, the housing 2 comprises a funnel body 9 in the outlet space 8. The funnel body 9 communicatively connects the outlet side of one of the exhaust gas treatment elements 6 with the outlet nozzle 7. This means that the funnel body 9 provides an exhaust gas guiding connection from the outlet end of one of the exhaust gas treatment elements 6 to the outlet nozzle 7. The funnel body 9 has a funnel surface 10 which is permeable to exhaust gas. Therefore the exhaust gas entering the outlet space 8 from the outlet ends of the other exhaust gas treatment elements 6 can reach the internal space of the funnel body 9 through the funnel surface 10 and the exhaust gas can therefore reach the outlet nozzle 7.

On the one hand, the funnel body is fixed to an intermediate face 11, that delimits the outlet space 8 opposite to the first side face 3 and is penetrated by all of the outlet ends of the exhaust gas treatment elements 6. The funnel body 9 is also attached to the outlet nozzle 7. Advantageously, the funnel body 9 can be formed integrally with the outlet nozzle 7. Alternatively, the funnel body 9 can be fixed to the first side face 3, which is penetrated by the outlet nozzle 7.

Figure 1:
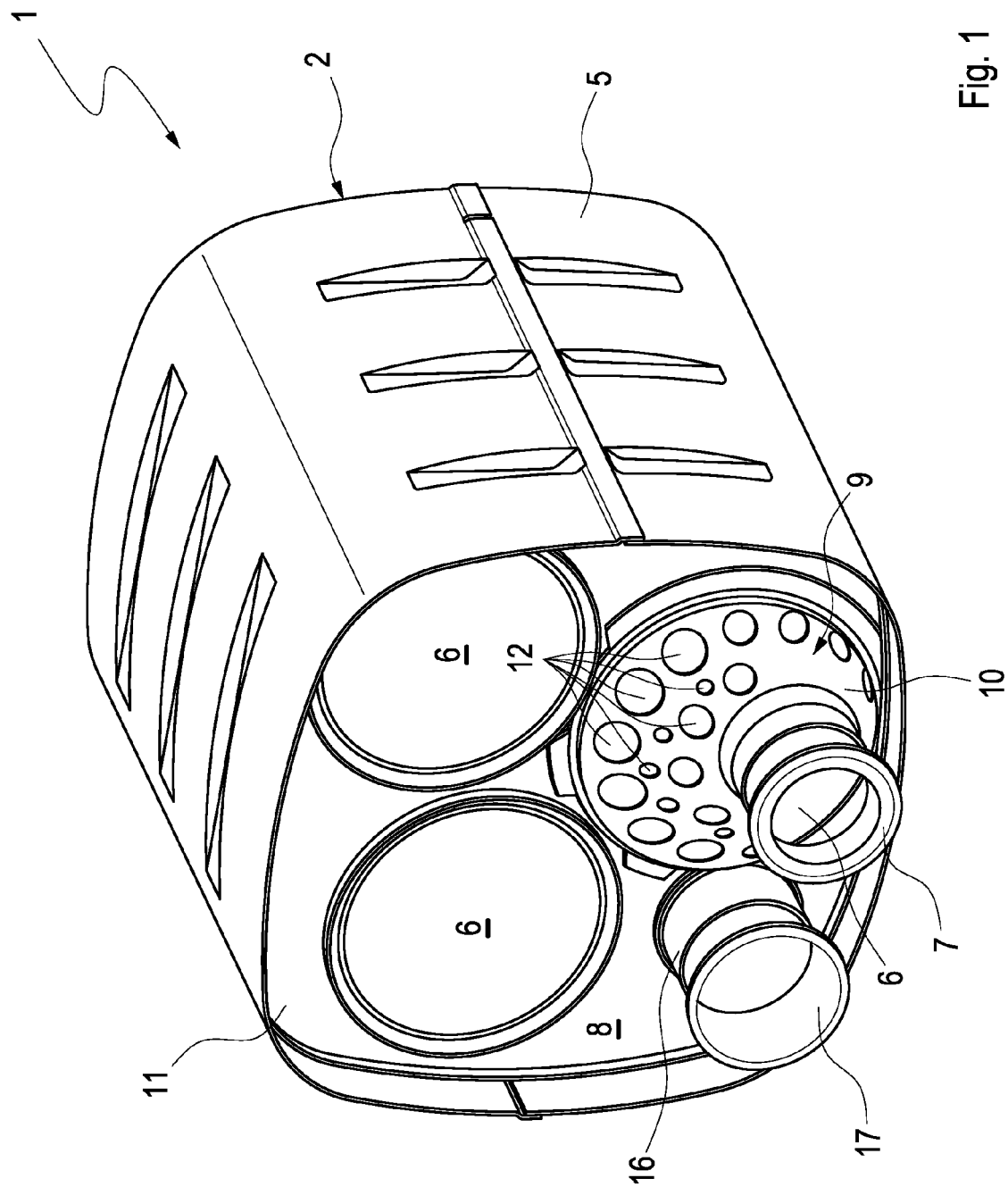
FIGS. 1 and 2 show schematically perspective views of various embodiments of an exhaust gas treatment unit, with the housing side face omitted.
Figure 2:
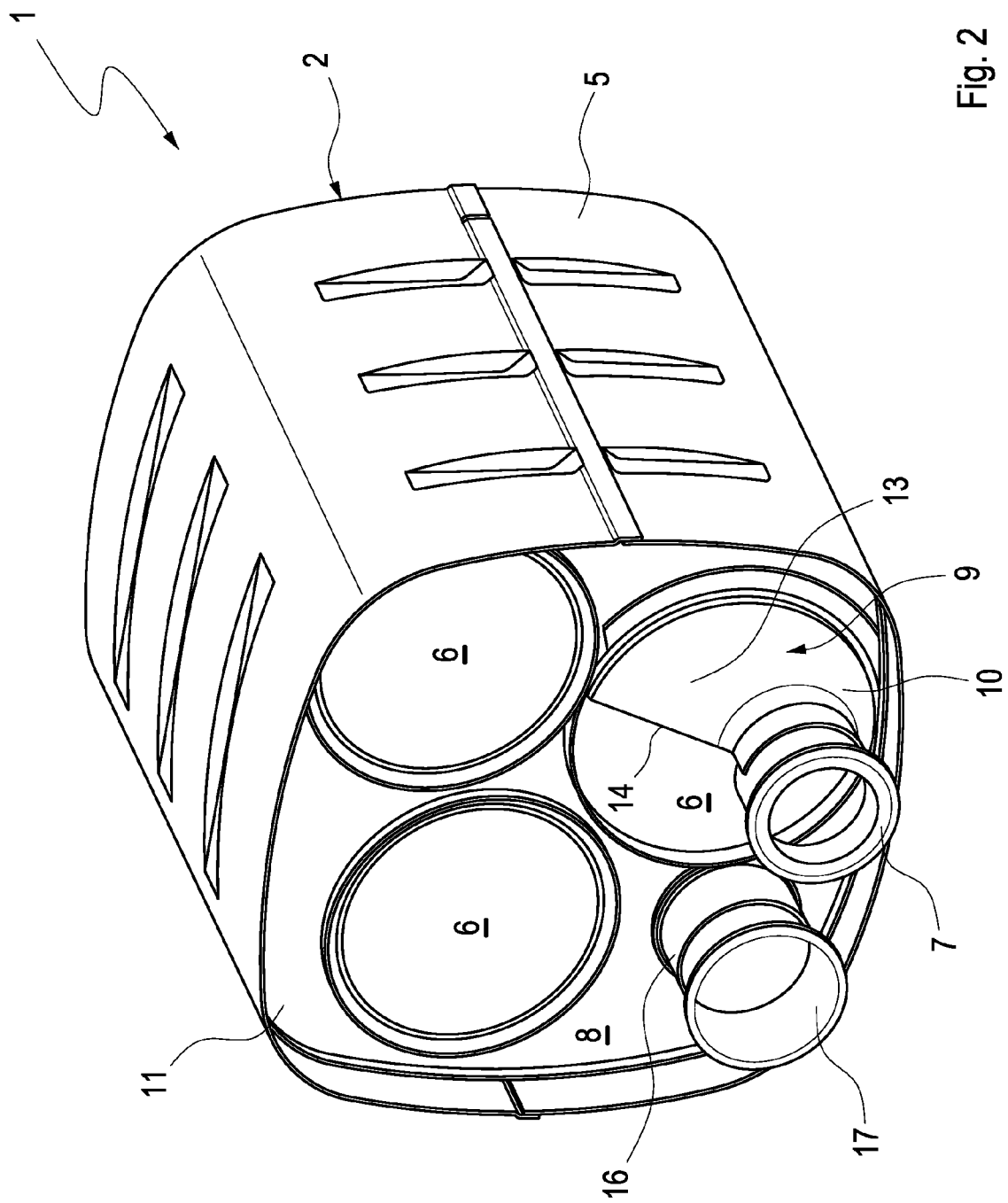
Figure 3:
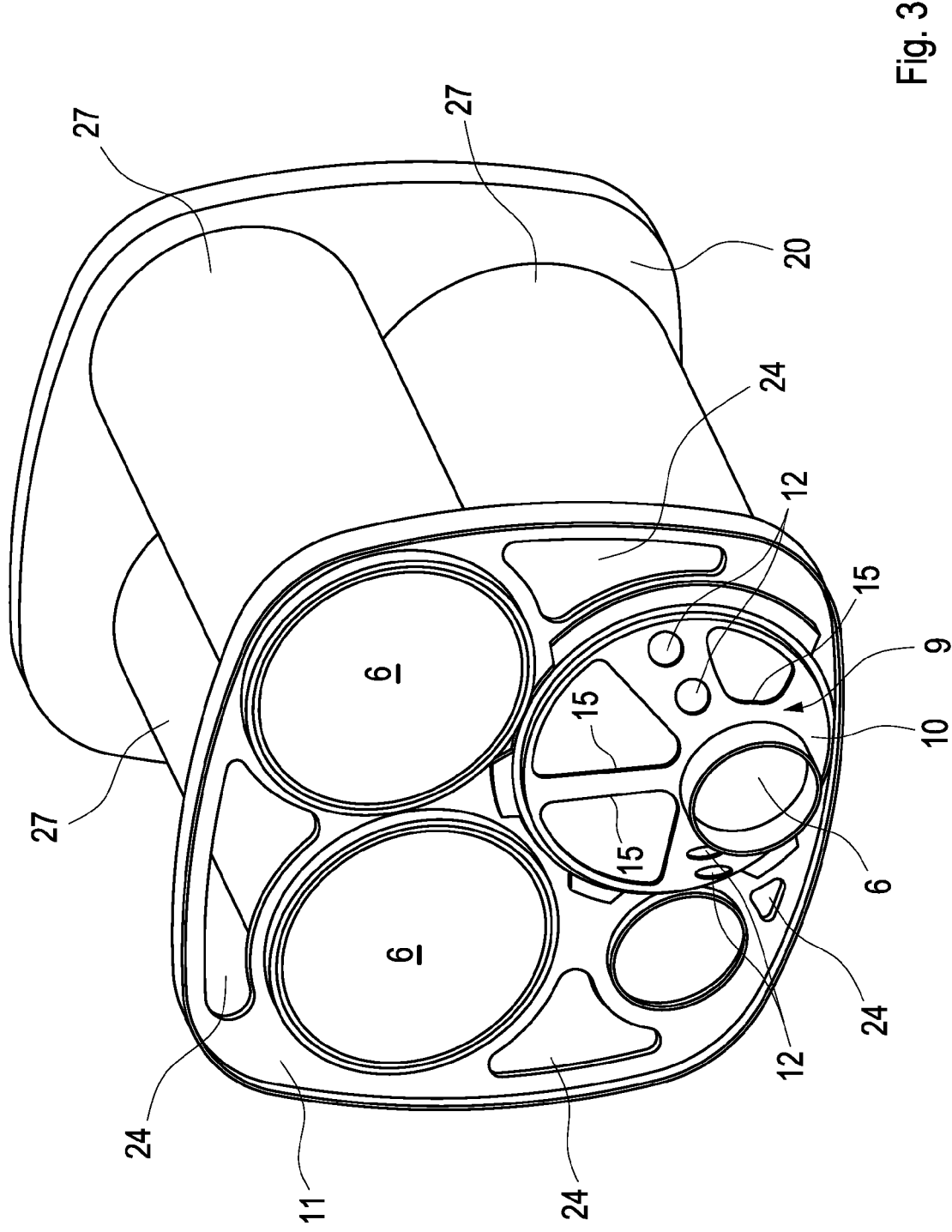
FIGS. 3 and 4 show perspective views of further embodiments of the exhaust gas treatment unit, with the housing omitted.
Figure 4:
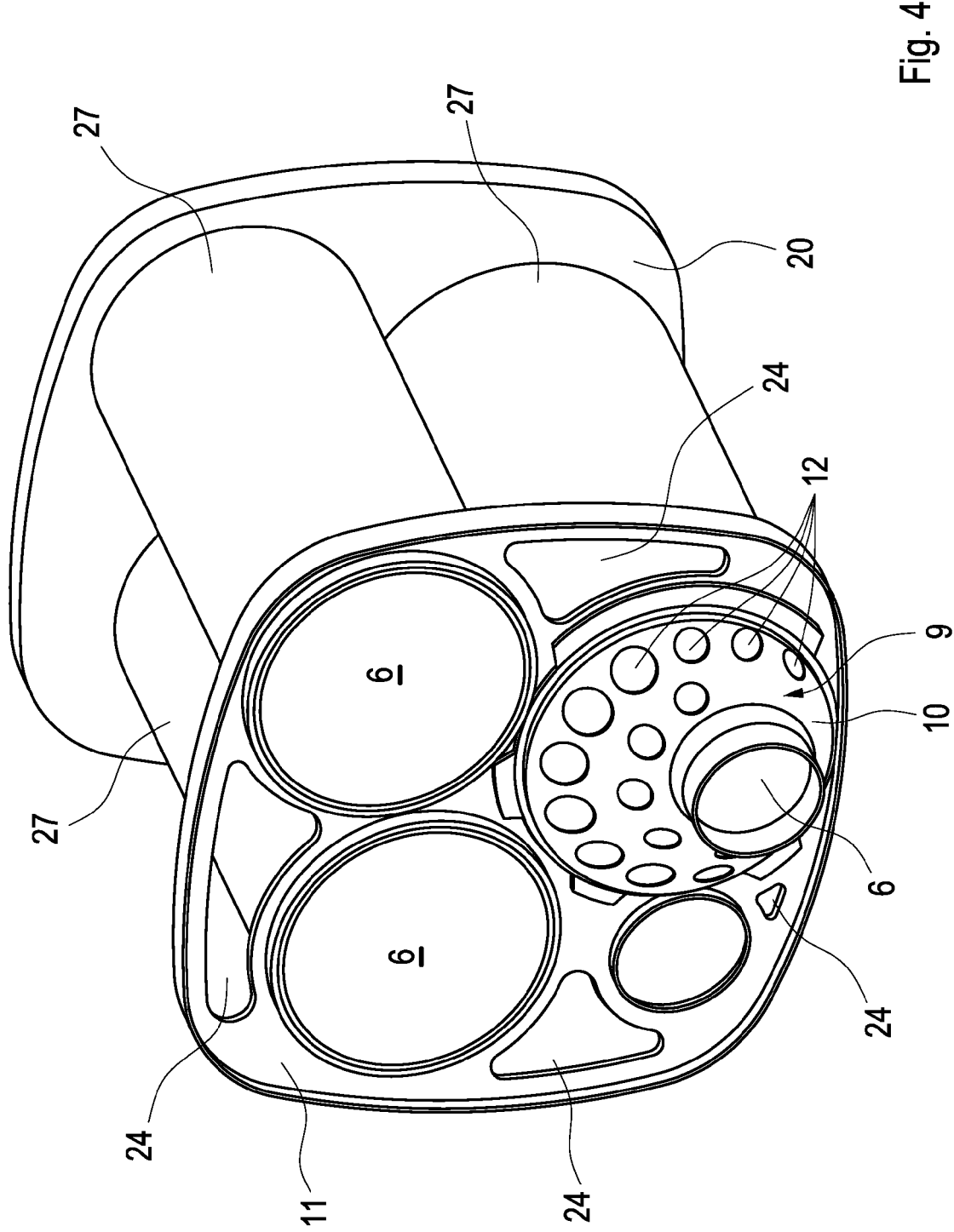

The exhaust gas permeability of the surface 10 of the funnel can be provided in any preferred way. For example, an appropriate perforation in the form of a plurality of small openings can be provided. FIG. 1 shows an embodiment where the funnel surface 10 has a plurality of relatively large openings 12 so that the exhaust gas can penetrate through it. FIG. 2 shows an embodiment where the funnel surface 10 is formed as a funnel surface segment 13, whereby a peripheral section is left out. Any possible proportions may be used, for example it is possible that the funnel surface segment 13 comprises a half or more of the entire circumference. FIG. 3 shows an embodiment with the funnel surface 13 having a plurality of cut outs 15, thus making the surface 13 penetrable for the exhaust gas. Openings 12 can also optionally be provided. FIG. 4 again shows the embodiment with the openings 12, whereby the embodiment shown in FIG. 4 is different from the embodiment in FIG. 1 because of a different arrangement and different diameters of the openings 12.

The desired pressure distribution in the outlet space 8 is achieved by appropriately choosing the position, size and direction of the openings 12, cut-outs 15 or segments of the funnel surface 13. Therefore, the behaviour of the flow out of, and hence through the exhaust gas treatment elements 6 can be influenced.

The housing 2 may in addition have an inlet tube 16 that connects an inlet nozzle 17 with the inlet space 18 that is also disposed in the housing 2. The inlet tube 16 and the inlet nozzle 17 are shown only in FIGS. 1, 2, 5 and 6. The inlet space 18 can only be seen in FIGS. 5 and 6. According to the embodiment shown in FIG. 5, the inlet tube 16 has a cross sectional area which increases in the direction of flow. As a result, the pressure of the flow through the inlet tube 16 decreases, whereby the inlet tube 16 has a certain diffuser effect. The decrease of the pressure due to the widening inlet tube favours a homogeneous distribution of the exhaust gas into the exhaust gas treatment elements 6, the inlet ends of which open into the inlet space 18.

An embodiment as shown in FIG. 6 is also possible, whereby the flow cross section of the inlet tube 16 is constant in the direction of flow 19.

According to FIG. 6 a further intermediate surface 20 can be arranged in the housing 2 opposite to the second side face 4 and delimiting the inlet space 18, whereby the intermediate surface 20 is penetrated by the exhaust gas treatment elements 6. This intermediate surface 20 has a pan-like formation 21, which faces the inlet space 18. The inlet tube 16 is received by the pan-like formation 21 of the intermediate surface 20. Therefore the inlet tube 16 ends inside of the pan-like formation 21. Due to such a construction, the distance 22 from the inlet tube 16 to the second side face 4 can be increased relative to the construction shown in FIG. 5. There is therefore much more available space in the inlet space 18, which improves the calming of the flow in the inlet space 18 and thus favours an even dispersion of the exhaust gas into the different exhaust gas treatment elements 6.

In examples shown, the housing 2 has two intermediate surfaces 11 and 20. At opposite sides they respectively delimit the outlet space 8 and the inlet space 18, at their facing sides the intermediate floors adjoin the resonance space 23. The two intermediate surfaces 11 and 20 delimit between them a resonance space 23. The resonance space 23 can be communicatively connected with the outlet space 8 through the intermediate surface 11. For this purpose the intermediate surface 11 can have openings 24. The intermediate surface 11 may also be perforated.

In the examples in FIGS. 5 and 6, both side faces 3, 4 of the housing 2 are double-walled and filled with a damping material 25. In addition, in examples given in FIG. 6, the surface 5 is double-walled and filled with damping material 25. The damping material 25 acts as a sound absorber preferably in a high-frequency area. The damping material 25 also enables a thermal insulation. The volume of the resonance space 23 can also be designed in such a way to make the resonance effects and/or the reflection effects suitable for damping sound preferably in the low-frequency area. In the embodiment shown in FIG. 5 the surface 5 is not double-walled, however in this embodiment the resonance room 23 is filled with damping material 25, therefore damping in the high frequency area is also achievable.

According to FIGS. 5 and 6, the exhaust gas treatment elements 6 can be formed by a plurality of exhaust gas treatment bodies 26 arranged for series flow behind one another. It is also possible to provide the exhaust gas treatment elements 6 as a single continuous exhaust gas treatment body. The exhaust gas treatment elements 6 are each inserted into a tube 27 that penetrates the intermediate walls 11, 20 and is appropriately supported by these walls. There can be a firm connection between the tube body 27 and one of the intermediate surfaces 11, 20 and there can be an axially moveable connection between the tube body 27 and the other intermediate surface 11, 20, for example in the form of a slip/sliding joint.

Each respective exhaust gas treatment element 6 can, for example, be an oxidation catalyst, and in particular a SRC-catalyst. Alternatively, each element 6 can be formed as a particle filter. Further combinations e.g. a particle filter with a catalytically active coating are possible. Another alternative is an upstream exhaust gas treatment body 26 formed as an oxidation catalyst, connected with a downstream exhaust gas treatment body 26, formed as a particle filter.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An exhaust gas treatment unit for an exhaust system of a combustion engine, comprising:
    a housing;
    a plurality of exhaust gas treatment elements arranged in the housing and through which a parallel flow can exist;
    an outlet nozzle, which penetrates a first side face of the housing;
    an outlet space, disposed in housing, into which at least one of the ends of the exhaust gas treatment elements opens; and
    a funnel body arranged in the outlet space and connecting one outlet end of one of the exhaust gas treatment elements with the outlet nozzle, whereby the surface of the funnel body is permeable to exhaust gas.

2. The exhaust gas treatment unit according to claim 1, wherein the funnel body is attached on the one hand to an intermediate face, that delimits the outlet space and which is penetrated by the outlet ends of the exhaust gas treatment elements, and the funnel body is also attached to at least one of the outlet nozzle and the side face which is penetrated by the outlet nozzle.

3. The exhaust gas treatment unit according to claim 1, wherein the permeability of the funnel surface is provided by at least one of perforations and cut outs and openings and the surface being formed as a funnel surface segment.

4. The exhaust gas treatment unit according to claim 1, wherein an inlet tube is provided which connects an inlet nozzle with an inlet space in the housing.

5. The exhaust gas treatment unit according to claim 4, wherein the inlet tube has a cross sectional area which increases in the flow direction.

6. The exhaust gas treatment unit according to claim 1, wherein an inlet tube is provided which communicatively connects an inlet nozzle with an inlet space disposed in the housing, the inlet tube penetrates the intermediate surface which borders the inlet space, wherein there is a pan-like formation is formed in the intermediate surface, the pan-like formation being open towards the inlet space and receiving the inlet tube.

7. The exhaust gas treatment unit according to claim 1, wherein two intermediate surfaces are arranged in the housing, are penetrated by the exhaust gas treatment elements and delimit a resonance space.

8. The exhaust gas treatment unit according to claim 7, wherein the resonance space communicates with the outlet space through one of the intermediate surfaces.

9. The exhaust gas treatment unit according to claim 1, wherein both side faces of the housing are double-walled and filled with damping material.

10. The exhaust gas treatment unit according to claim 1, wherein a surface of the housing is double-walled and filled with damping material.

11. The exhaust gas treatment unit according to claim 1, wherein the respective exhaust gas treatment element comprises either a single exhaust gas treatment body or a plurality of exhaust gas treatment bodies arranged in series.

12. The exhaust gas treatment unit according to claim 1, wherein the respective exhaust gas treatment element is formed as an oxidation catalyst or as a particle filter.

13. An exhaust gas treatment unit for an exhaust system of a combustion engine, comprising:
    a housing; and
    an inlet tube within the housing, the inlet tube connecting an inlet nozzle with an inlet space in the housing, wherein the inlet tube has a cross sectional area which increases in the flow direction;
    wherein a plurality of exhaust gas treatment elements are arranged in the housing and through which a parallel flow can exist.

14. The exhaust gas treatment unit according to claim 13, wherein an outlet nozzle penetrates a first side face of the housing.

15. The exhaust gas treatment unit according to claim 13, wherein an outlet space is disposed in housing, into which at least one of the ends of the exhaust gas treatment elements opens.

16. An exhaust gas treatment unit for an exhaust system of a combustion engine, comprising:
    a housing, wherein an inlet tube is provided which connects an inlet nozzle with an inlet space in the housing, wherein the inlet tube has a cross sectional area which increases in the flow direction;
    wherein a plurality of exhaust gas treatment elements are arranged in the housing and through which a parallel flow can exist;
    wherein an outlet space is disposed in housing, into which at least one of the ends of the exhaust gas treatment elements opens; and wherein a funnel body is arranged in the outlet space and connecting one outlet end of one of the exhaust gas treatment elements with the outlet nozzle.

17. The exhaust gas treatment unit according to claim 16, wherein the surface of the funnel body is permeable to exhaust gas.

18. The exhaust gas treatment unit according to claim 16, wherein the funnel body is attached on the one hand to an intermediate face, that delimits the outlet space and which is penetrated by the outlet ends of the exhaust gas treatment elements, and the funnel body is also attached to at least one of the outlet nozzle and the side face which is penetrated by the outlet nozzle.

19. The exhaust gas treatment unit according to claim 17, wherein the permeability of the funnel surface is provided by at least one of perforations and cut outs and openings and the surface being formed as a funnel surface segment.

20. The exhaust gas treatment unit according to claim 13, wherein the inlet tube penetrates the intermediate surface which borders the inlet space, wherein there is a pan-like formation is formed in the intermediate surface, the pan-like formation being open towards the inlet space and receiving the inlet tube.

21. The exhaust gas treatment unit according to claim 13, wherein two intermediate surfaces are arranged in the housing, are penetrated by the exhaust gas treatment elements and delimit a resonance space.

22. The exhaust gas treatment unit according to claim 21, wherein the resonance space communicates with the outlet space through one of the intermediate surfaces.

23. The exhaust gas treatment unit according to claim 13, wherein both side faces of the housing are double-walled and filled with damping material.

24. An exhaust gas treatment unit for an exhaust system of a combustion engine, comprising:
   a housing; and
   an inlet tube within the housing, the inlet tube connecting an inlet nozzle with an inlet space in the housing, wherein the inlet tube has a cross sectional area which increases in the flow direction;
   wherein a surface of the housing is double-walled and filled with damping material.

25. The exhaust gas treatment unit according to claim 13, wherein the respective exhaust gas treatment element comprises either a single exhaust gas treatment body or a plurality of exhaust gas treatment bodies arranged in series.

26. The exhaust gas treatment unit according to claim 13, wherein the respective exhaust gas treatment element is formed as an oxidation catalyst or as a particle filter.

27. An exhaust gas treatment unit for an exhaust system of a combustion engine, comprising:
   a housing; and
   an inlet tube within the housing, the inlet tube connecting an inlet nozzle with an inlet space in the housing, wherein the inlet tube has a cross sectional area which increases in the flow direction;
   wherein the housing includes a first sidewall through which fluid operably passes as the fluid enters the housing, the inlet tube having an inlet end upstream from an outlet end, the inlet end of the inlet tube being closer to the first sidewall than the outlet end of the inlet tube.

28. The exhaust gas treatment unit according to claim 27, wherein the housing includes a second sidewall axially spaced apart from the first sidewall forming an opposite side of the housing as the first sidewall, the second sidewall defining at least part of the inlet space in the housing, the outlet end of the inlet tube being closer to the second sidewall than the first sidewall.

29. The exhaust gas treatment unit according to claim 28, wherein at least one exhaust gas treatment element is arranged in the housing, the housing defines an outlet space within the housing, the outlet space being fluidly connected to the inlet space by the at least one exhaust gas treatment element, the outlet space being defined at least in part by the first sidewall, fluid that has passed through the at least one exhaust gas treatment element exits the housing through the first sidewall.

* * * * *